United States Patent Office 2,913,310
Patented Nov. 17, 1959

---

2,913,310

CHEMICAL RECOVERY PROCESS

Lloyd T. Sandborn and Dan M. Nall, Crossett, Ark., assignors to Crossett Chemical Company, Crossett, Ark., a corporation of Arkansas No Drawing. Application May 14, 1956
Serial No. 584,460

10 Claims. (Cl. 23—131)

This invention relates to a process for recovering lignin, organic acids and sodium sulfite from a concentrate of the liquor resulting from an alkaline cook of cellulosic material. These acids comprise formic, acetic, lactic and glycolic, and can be defined as saturated monocarboxylic acids having 1–3 carbon atoms in which one of the hydrogen atoms on the carbon atom adjacent the carboxyl group may be substituted by an hydroxyl group. Although the invention is applicable to alkaline cooks broadly (e.g., including such cooks as described in our copending application, Serial No. 318,583, filed November 3, 1952, now Patent No. 2,685,434), for the sake of clarity and simplicity this liquor, as well as liquor from alkaline pulping processes, will sometimes be called black liquor hereinafter. Our copending application, Serial No. 584,458, filed on even date herewith and entitled "Recovery of Soda From Organic Acids," broadly covers a process of recovering soda as sodium bisulfite from the water-soluble sodium salts of organic acids. Our copending applications, Serial No. 318,531 and 318,532, filed November 3, 1952, now Patents 2,750,412 and 2,750,413, cover a process of recovering formic, acetic, lactic and glycolic acids from black liquor, and also of recovering a precipitate comprising organic matter and soda in such form that it can be returned to the pulp mill recovery system. According to the present invention, we have discovered a new and improved process of recovering from said liquor lignin, the four acids listed above and sodium sulfite wherein our discovery of recovering soda from organic acids comprises one of the novel steps of the invention.

This invention broadly comprises recovering from a concentrate of the liquor resulting from an alkaline cook of cellulosic material lignin, sodium sulfite and saturated monocarboxylic acids having 1–3 carbon atoms in which one of the hydrogen atoms on the carbon atom adjacent the carboxyl group may be substituted by an hydroxyl group, which comprises precipitating the lignin therefrom by adding thereto a precipitant selected from the group consisting of sodium bicarbonate and carbon dioxide, filtering out the precipitated lignin, precipitating and removing sodium carbonate from the filtrate, contacting the resulting solution with sulfur dioxide and acetone whereby there is formed an acetone-sodium bisulfite adduct, the soda of which has been derived from said solution, and a solution of organic acids in acetone, filtering out the adduct, and thereby leaving the organic acids in solution.

There has been a long-felt need in the art for a single recovery system which can serve both the kraft pulp mill and the neutral sulfite pulp mill. The fact that it fills this need admirably is one outstanding application and feature of this invention. The invention provides for recovery of organic acids from kraft black liquor and at the same time produces sodium sulfite for use in the neutral sulfite mill.

In the kraft process, wood is cooked with a solution which contains sodium hydroxide and sodium sulfite. During the cook, part of the lignin and part of the hemicellulose dissolves, leaving the cellulose in a form suitable for paper making. The liquor containing the hemicellulose and lignin is commonly called black liquor. It is usual practice to concentrate this liquor by evaporation and to burn the solids thereof in a furnace for recovery of soda. In order to make up for soda losses that have occurred during the process, sodium sulfate is added before the solids are burned. Burning the organic matter furnishes a large part of the heat requirements of the pulp mill and in addition serves the useful function of reducing sulfur compounds to sulfide. The molten residue from the furnace contains sodium carbonate and sodium sulfide. By dissolving this material in water and treating it with calcium hydroxide, a solution of sodium hydroxide and sodium sulfide is obtained for reuse as cooking liquor for another batch of wood. Obviously the organic acids that are in black liquor are destroyed in the furnace during conventional recovery.

In the neutral sulfite process, the chemicals used for cooking the wood are sodium sulfite and sodium carbonate. When the liquors from this process are evaporated and burned, they give the same chemicals as are obtained in the kraft process, i.e., sodium carbonate and sodium sulfide. A number of processes have been proposed for changing these chemicals into a mixture of sodium sulfite and sodium carbonate but all these processes are complex and expensive. The main object of these processes is to convert the sodium salts to sodium sulfite by treatment with sulfur dioxide. The complicating factor is that objectionable side reactions occur to produce sodium thiosulfate which is undesirable in this process.

The process of the present invention may conveniently be divided into the following steps.

*Step 1.*—Precipitating and removing lignin from the black liquor or liquor concentrate by contacting same with sodium bicarbonate or carbon dioxide.

*Step 2.*—Precipitating and removing sodium carbonate from the solution resulting from Step 1 by concentrating the solution or by adding methanol thereto.

*Step 3.*—Carbonating the aqueous solution from Step 2 and removing the solid sodium bicarbonate that forms.

*Step 4.*—Adding sulfur dioxide and acetone to the solution resulting from Step 3 to form a solution of the organic acids in the acetone and a solid sodium bisulfite adduct of the acetone, which adduct is then removed.

*Step 5.*—Recovering the acetone from the solution of organic acids for reuse in Step 4.

*Step 6.*—Adding the sodium carbonate from Step 2 to the adduct from Step 4 and removing the acetone from the resulting mixture for reuse in Step 4 and leaving a solution of sodium sulfite.

The present invention will now be described in greater detail in accordance with one preferred embodiment thereof.

STEP 1

*Recovery of lignin*

The main object at this stage is to precipitate lignin, remove hydrogen sulfide gas and at the same time change as much of the soda as possible to sodium carbonate. Preferably black liquor concentrate having a solids content of about 30%–50% will be used because this is the concentration in which it is available from the multiple effect evaporators in ordinary pulp mill operations. Of course other concentrations are applicable. Sodium bicarbonate is added slowly to the black liquor with agitation, and the mixture is heated to flock the lignin precipitate. The lignin can be returned to the pulp mill recovery system or, since it is similar to the lignin derived from alkaline pulping liquors by conventional means, it also can be used in much the same way as other "alkali lignins" are used. The lignin forms a semi-tarry precipitate which is easily decanted or filtered out. When cooled the lignin becomes brittle and can be pulverized to a powder which is easily handled. We may use carbon dioxide instead of sodium bicarbonate to precipitate the lignin.

STEP 2

Recovery of sodium carbonate

After removing lignin, the remaining aqueous solution comprises sodium carbonate and sodium salts of the desired organic acids. It is desired to recover the sodium carbonate for use in Step 6 of the process. We may recover the sodium carbonate by either one of three ways, namely (1) concentrating the solution by evaporation and thereby causing the sodium carbonate to separate out of solution, (2) concentrating the solution until it is saturated or super-saturated with sodium carbonate and then cooling the solution to a temperature at which the sodium carbonate separates out of solution, and (3) adding methanol to the solution and thereby causing the sodium carbonate to separate therefrom. The methanol is recovered for reuse by distillation. In order to reduce the amount of methanol required it is desirable to concentrate the solution by removing some water before adding the methanol. Preferably there will be a difference in subsequent steps of the invention depending on which of these methods is employed to recover the sodium carbonate. For example, with methods (1) and (2) an appreciable amount of sodium carbonate remains in the solution. By carbonating this solution, sodium bicarbonate precipitates and can be removed, as described in Step 3 below. Whereas with method (3) removal of sodium carbonate is complete enough so that carbonation is less attractive, so when methanol is used preferably the sodium carbonate will be filtered out, methanol distilled from the filtrate and the remaining solution processed according to Step 4 below.

STEP 3

Carbonation of Step 2 solution

After removing part of the sodium carbonate by methods (1) or (2) of Step 2, the solution includes the sodium salts of the desired organic acids and also some sodium carbonate. The object of this step is to produce and recover sodium bicarbonate which can be used in Step 1. This is accomplished by treating the solution with carbon dioxide gas. Several sources of carbon dioxide are suitable, including the carbon dioxide evolved in Step 6 of this process. This carbonation converts sodium carbonate to sodium bicarbonate which separates out of solution and is removed since it is less soluble than sodium carbonate.

STEP 4

Liberating the organic acids from their sodium salts and converting the soda into a form adapted for use in neutral sulfite pulping The starting material is the solution from Step 3 or from method (3) of Step 2, and it includes the desired organic acids in the form of their sodium salts. The object of this step is to liberate the organic acids from their salts and at the same time form a sodium salt that is capable of being readily converted into sodium sulfite and therefore useful in neutral sulfite pulping. To this starting material solution is added acetone and sulfur dioxide. We may use sulfurous acid instead of sulfur dioxide. However, sulfur dioxide is equivalent to sulfurous acid because sulfur dioxide forms sulfurous acid in the aqueous involved. Addition of acetone and sulfur dioxide to the starting solution from an acetone-sodium bisulfite adduct, sometimes called addition product, which is a solid and contains practically all of the soda. The adduct is then removed, leaving the free organic acids in the aqueous acetone solution. By way of explanation of the probable mechanism involved, we submit the following equations.

(1) 
$AcONa + H_2SO_3 \rightleftharpoons NaHSO_3 + AcOH$

Reaction 1 will go to completion only if the sodium bisulfite or the organic acid is removed from the reaction zone. The acetone reacts with the sodium bisulfite to give a solid adduct which separates from the solution and can be removed from the reaction zone, e.g. by filtration, thus (2) 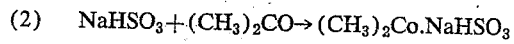
$NaHSO_3 + (CH_3)_2CO \rightarrow (CH_3)_2Co \cdot NaHSO_3$

STEP 5

Recovery of organic acids

The solution remaining from Step 4 above after removing the adduct is primarily acetone having formic, acetic, lactic and glycolic acids dissolved therein. The object is to separate the acids from the acetone, which is done by heating the solution at 70° C.–80° C. The acetone is thus distilled and recycled to the process, leaving a residue of organic acids in aqueous solution. If desired, the organic acids can be recovered from the aqueous solution by extraction or by other known means. For example, the volatile acids, acetic and formic, can be removed with the water by distillation and the lactic and glycolic acids can be recovered from the residue by treatment with an alcohol to produce esters.

STEP 6

Recovery of acetone, sodium sulfite and carbon dioxide

This recovery is effected by heating in water a combination of the sodium carbonate from Step 2 and the adduct from Step 4. The reactions which occur can be represented by the equations:

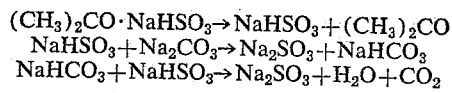

$(CH_3)_2CO \cdot NaHSO_3 \rightarrow NaHSO_3 + (CH_3)_2CO$
$NaHSO_3 + Na_2CO_3 \rightarrow Na_2SO_3 + NaHCO_3$
$NaHCO_3 + NaHSO_3 \rightarrow Na_2SO_3 + H_2O + CO_2$ The acetone that is liberated is distilled from the hot solution as it forms. By variation in the ratio of sodium carbonate to adduct, one can produce any desired combination of sodium sulfite, sodium bisulfite, sodium bicarbonate, and sodium carbonate. In order to get all of the soda in the form of sodium sulfite, one uses two molecular equivalents of adduct to one molecular equivalent of sodium carbonate and expels both acetone and carbon dioxide by heating the mixture. It is usually desirable to use this ratio.

However, if one wishes to obtain a mixture of sodium sulfite and sodium bicarbonate, he uses equal molecular amounts of adduct and sodium carbonate and adds the adduct to the heated solution of the sodium carbonate. In this case, one tries to avoid evolution of carbon dioxide. To the extent that carbon dioxide does escape, there will be sodium carbonate rather than sodium bicarbonate in the final solution.

In case one desires to produce a mixture of sodium sulfite and sodium bisulfite, he can obviously accomplish this by using more than two molecular equivalents of adduct to one of sodium carbonate.

Obviously any sodium bicarbonate that is present in the carbonate that is used in this step will be utilized as shown in the equations.

The following examples will illustrate specific embodiments of this invention, and reference must be made to the appended claims for the scope of the invention. In the examples percent is by weight.

EXAMPLE 1

A 230-gram portion of solid sodium bicarbonate was added slowly with moderate stirring to two liters of concentrated kraft black liquor (32.0% solids). The mixture was heated to 90° C. for one hour and then filtered to separate the lignin precipitate from the solution. The filtrate was concentrated by evaporating and the solid sodium carbonate that precipitated was removed from the solution by filtration. The solid obtained in this manner had a soda content equivalent to 183 grams of $Na_2CO_3$. After such removal of sodium carbonate, the aqueous solution still had a volume of about 800 ml. On adding carbon dioxide gas to this concentrated solution, a precipitate formed which was separated from the solution by filtration. Analysis of this solid showed a soda content equivalent to 119 grams of sodium bicarbonate. After the removal of sodium bicarbonate, the filtrate contained sodium salts of 18.5 grams formic acid, 14.6 grams acetic acid, 10.9 grams glycolic acid, and 16.4 grams lactic acid. This solution was concentrated by evaporation to a volume of 300 ml., then mixed with 1500 ml. of acetone and an excess of sulfur dioxide. The solid acetone bisulfite adduct was removed by filtration and washed with 900 ml. of acetone to which 30 ml. of water had been added. Analysis showed that the adduct contained 85.9 grams $Na_2O$ as compared to 3.0 grams $Na_2O$ remaining in the acetone solution. The aqueous acetone solution was heated to distill off the acetone and the excess sulfur dioxide, leaving an aqueous solution that contained 18.2 grams formic acid, 13.1 grams acetic acid, 9.6 grams glycolic acid, and 15.2 grams lactic acid. The solid adduct was dissolved in water, combined with an aqueous solution containing 147 grams of sodium carbonate and heated until all the carbon dioxide and acetone were expelled, leaving a solution containing sodium sulfite.

EXAMPLE 2

Two liters of concentrated kraft black liquor (31.6% solids) was treated with carbon dioxide gas until the gas was no longer adsorbed. The mixture was then heated at 90° C. for an hour and filtered to separate the lignin precipitate from the solution. The filtrate was concentrated by evaporation to a volume of one liter and 1250 ml. of methanol was added. After about an hour, the precipitate of sodium carbonate and bicarbonate was separated from the solution by filtration. The $Na_2O$ content of the precipitate was 91.3 grams as compared with 78.0 grams remaining in the aqueous methanol solution. The methanol solution was heated to distill off the methanol and the residual aqueous solution was concentrated to a volume of about 300 ml. this concentrated aqueous solution was combined with 1500 ml. of acetone and an excess of sulfur dioxide. The solid acetone bisulfite adduct, after it was washed with a liter of acetone containing 25 ml. of water, was found to contain 74.2 grams $Na_2O$ as compared with 2.4 grams in the acetone filtrates. The adduct and the acetone filtrate were processed as described in Example 1 and the results were substantially the same as described in that example.

As many apparently widely different embodiments of this invention may be made without departing from the spirit and scope thereof, it is to be understood that the invention is not limited to the specific embodiments thereof except as defined in the appended claims.

What is claimed is:

1. The process which comprises contacting a concentrate of a liquor resulting from an aqueous alkaline cook of cellulosic material and containing sodium salts of saturated monocarboxylic acids having from one to three carbon atoms, with a material selected from the group consisting of a sodium bicarbonate and carbon dioxide to precipitate a substantial portion of the lignin in the said concentrate in a mother liquor containing said sodium salts, separating said lignin precipitate from said mother liquor, and thereafter reacting the mother liquor with acetone and a material selected from the group consisting of sulfur dioxide and sulfurous acid to produce (a) an aqueous acetone solution of said acids, and (b) a precipitate of an acetone-sodium bisulfite addition product.

2. The process of claim 1 wherein the sodium salts present in said liquor comprise the sodium salts of alpha-hydroxy saturated monocarboxylic acids having from one to three carbon atoms per molecule.

3. The process of claim 1 wherein said addition product is separated from said acid solution and acetone is recovered from said addition product.

4. The process of claim 3 wherein acetone is recovered by the distillation of an aqueous solution of sodium carbonate and said separated addition product.

5. The process of claim 1 wherein sodium carbonate is recovered from said lignin precipitate mother liquor.

6. The process of claim 1 wherein said lignin is precipitated from said concentrate by the utilization of carbon dioxide as a precipitant.

7. A process which comprises contacting a concentrate resulting from an aqueous alkaline cook of cellulosic material and containing sodium salts of saturated monocarboxylic acids having from one to three carbon atoms per molecule, with a material selected from the group consisting of carbon dioxide and sodium bicarbonate, removing the lignin precipitate, concentrating the mother liquor from which the lignin precipitate is removed to effect crystallization of sodium carbonate therefrom, recovering the sodium carbonate so crystallized, contacting the mother liquor from which the sodium carbonate is removed with carbon dioxide gas to effect precipitation of sodium bicarbonate, separating the sodium bicarbonate precipitate and reacting the mother liquor from which the sodium bicarbonate is removed with acetone and a material selected from the group consisting of sulfur dioxide and sulfurous acid to produce an aqueous acetone solution of the acids present in said concentrate and a precipitate of an acetone-sodium bisulfite addition product, and separating said addition product from said acid solution.

8. The process of claim 7 wherein said separated addition product is dissolved in water together with sodium carbonate, and acetone is recovered from the resulting solution by distillation.

9. The process of claim 8 wherein the sodium carbonate employed in the aqueous solution of said addition product is obtained as a precipitate from the concentrate of mother liquor from which said lignin precipitate is separated.

10. The process which comprises reacting a concentrate, resulting from an aqueous alkaline cook of cellulosic material and containing a sodium salt of a saturated monocarboxylic acid having from one to three carbon atoms per molecule, with acetone and a material selected from the group consisting of sulfur dioxide and sulfurous acid to produce (a) an aqueous acetone solution of said acids and (b) a precipitate of an acetone-sodium bisulfite addition product, separating said addition product from said acid solution, forming an aqueous solution of said addition product and sodium carbonate, and recovering acetone from said addition product-soduim carbonate solution, there having been removed from said concentrate prior to said reaction a substantial portion of the lignin normally present therein.

References Cited in the file of this patent

UNITED STATES PATENTS

| | | |
|---|---|---|
| 723,311 | Robertson et al. | Mar. 24, 1903 |
| 1,017,320 | Rinman | Feb. 13, 1912 |
| 2,618,610 | Thomsen | Nov. 18, 1952 |